(12) United States Patent
Lykkegaard

(10) Patent No.: US 7,685,898 B2
(45) Date of Patent: Mar. 30, 2010

(54) LINEAR ACTUATOR

(75) Inventor: Anders Lykkegaard, Brendola (IT)

(73) Assignee: Linak A/S, Nordborg (DK)

( * ) Notice: Subject to any disclaimer, the term of this patent is extended or adjusted under 35 U.S.C. 154(b) by 270 days.

(21) Appl. No.: 11/663,265

(22) PCT Filed: Sep. 28, 2005

(86) PCT No.: PCT/DK2005/000614

§ 371 (c)(1),
(2), (4) Date: Jun. 12, 2007

(87) PCT Pub. No.: WO2006/034711

PCT Pub. Date: Apr. 6, 2006

(65) Prior Publication Data

US 2009/0120219 A1    May 14, 2009

(30) Foreign Application Priority Data

Sep. 29, 2004    (DK) ................................ 2004 01487

(51) Int. Cl.
*F16H 27/02*    (2006.01)
(52) U.S. Cl. .................. 74/89.26; 74/89.39; 74/424.72
(58) Field of Classification Search ................ 74/89.23, 74/89.25, 89.26, 89.27, 89.28, 89.29, 89.39, 74/424.71, 424.7
See application file for complete search history.

(56) References Cited

U.S. PATENT DOCUMENTS

| 4,872,903 | A | * | 10/1989 | Periou ..................... 74/89.38 |
| 5,918,505 | A |   | 7/1999  | Jensen |
| 6,142,032 | A | * | 11/2000 | Creager .................... 74/441 |
| 2005/0103138 | A1 | * | 5/2005 | Chen et al. ............... 74/89.26 |
| 2007/0214902 | A1 | * | 9/2007 | Wang ...................... 74/89.26 |

FOREIGN PATENT DOCUMENTS

| DK | 174457  | 3/2003 |
| EP | 0586326 | 3/1994 |
| EP | 1460311 | 9/2004 |

OTHER PUBLICATIONS

English Abstract of EP1460311.
English Abstract of DK174457.

* cited by examiner

*Primary Examiner*—David M Fenstermacher
(74) *Attorney, Agent, or Firm*—Dykema Gossett PLLC

(57) ABSTRACT

A linear actuator includes a spindle, a main nut, and a safety nut which cooperates with the main nut. The flank of the safety nut closest to the load supported by the spindle is made steep, i.e., forms an acute angle of between about 20 to 30 degrees with its longitudinal axis, thereby providing a great frictional force by engagement with the threads of the spindle in the event that the main nut fails. The great frictional force is brought about because the threads of the spindle, exclusively with the outer edge, become in linear engagement with the steep flank on the safety nut.

5 Claims, 4 Drawing Sheets

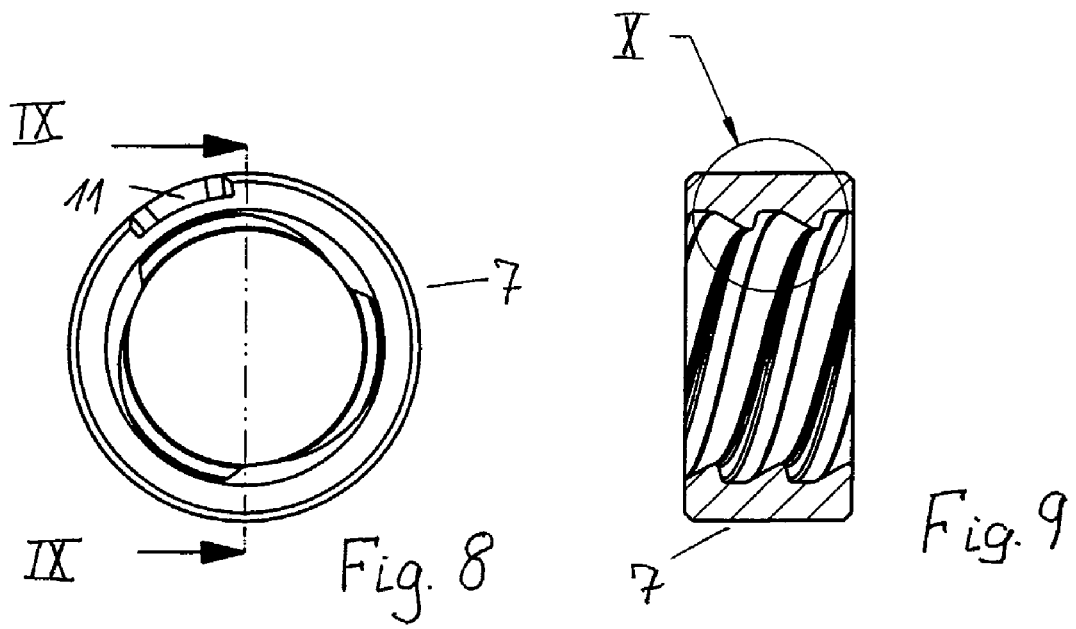
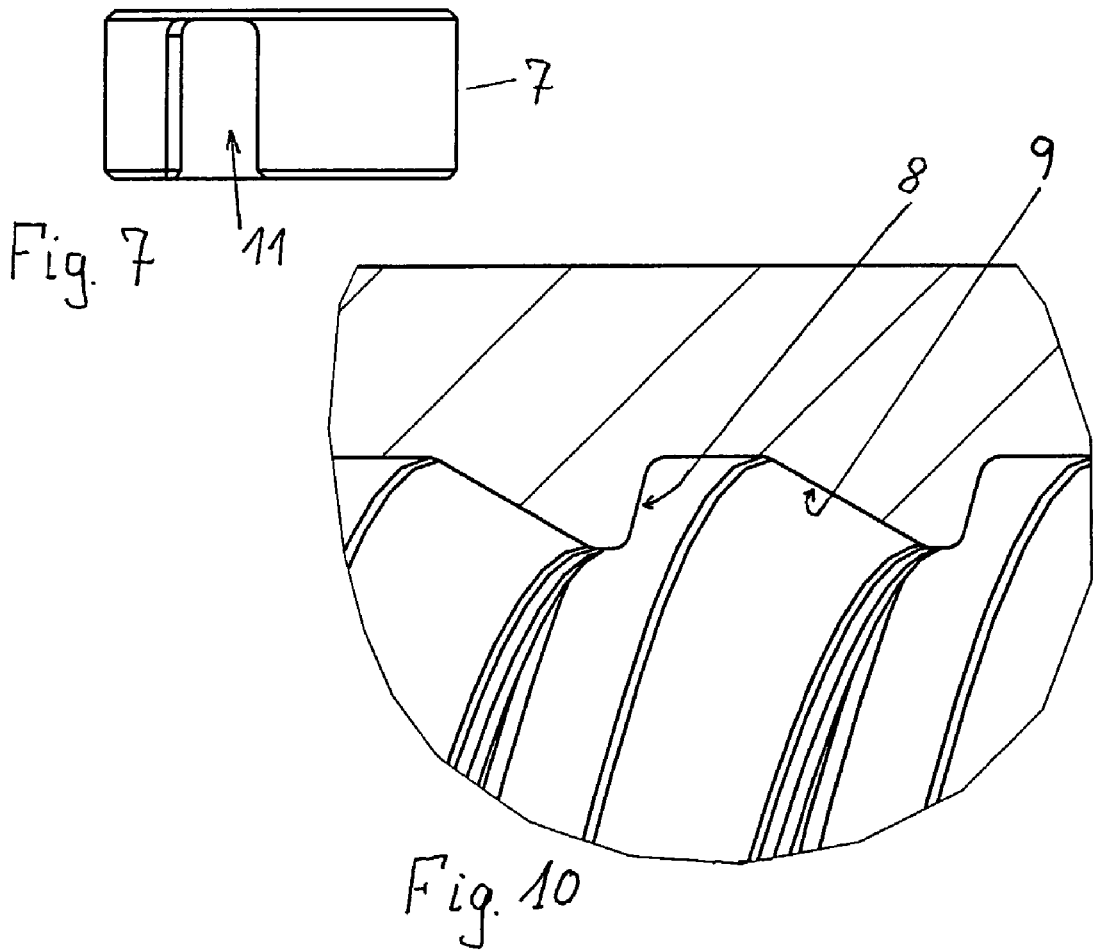

LINEAR ACTUATOR

BACKGROUND OF THE INVENTION

1. Field of the Invention

The present invention relates to a linear actuator of the type defined in the introductory portion of claim 1.

2. The Prior Art

EP 0 586 326 B1 and EP 1 134 454 B1 disclose linear actuators which are provided with a safety nut which is connected with the main nut and follows it as a slave as long as the main nut is intact. In the event that the main nut fails, the connection is interrupted, whereby the safety nut takes over the load. Both structures are configured such that the safety nut can only move the load in the direction of loading. In case of, e.g., a pressure load, the actuator is not capable of lifting the load, but exclusively to lower it.

The object of the invention is to provide an improved effect of the safety nut.

SUMMARY OF THE INVENTION

This object is achieved according to the invention by constructing the actuator to include a safety nut with grooves having a second flank which is steep, i.e., forms an acute angle relative to a longitudinal axis of the safety nut. This results in a great frictional force by engagement with the threads of the spindle in the event that the main nut fails. The great frictional force results from the fact that the threads of the spindle, exclusively with the outer edge, get into point-shaped engagement with the steep flank of the safety nut. The point-shaped engagement is rather a linear engagement seen over the entire threads of the safety nut.

In the event that the spindle is of steel and the safety nut is likewise of steel, it is expedient to harden the safety nut to avoid the situation that the spindle destroys the nut by abrasion.

The safety nut may be caused to follow the main nut in different ways. In an embodiment, the safety nut is placed in a well at the end of the main nut, an axially extending fin being provided in the well. The safety nut is provided with a corresponding groove to receive the fin. When the groove is not through-going, but only extends over a portion of the height of the safety nut, correct mounting of the safety nut is ensured in a simple manner.

Additional features of the invention will appear from the following embodiment of the invention, which will be described more fully below with reference to the accompanying drawings.

BRIEF DESCRIPTION OF THE DRAWINGS

FIG. 7 shows the safety nut seem from the side, FIG. 8 shows the safety nut seen from one end, FIG. 9 shows a longitudinal section through the safety nut, and FIG. 10 shows an enlarged section at the side of the safety nut.

DETAILED DESCRIPTION OF THE PREFERRED EMBODIMENTS

Figure 1:
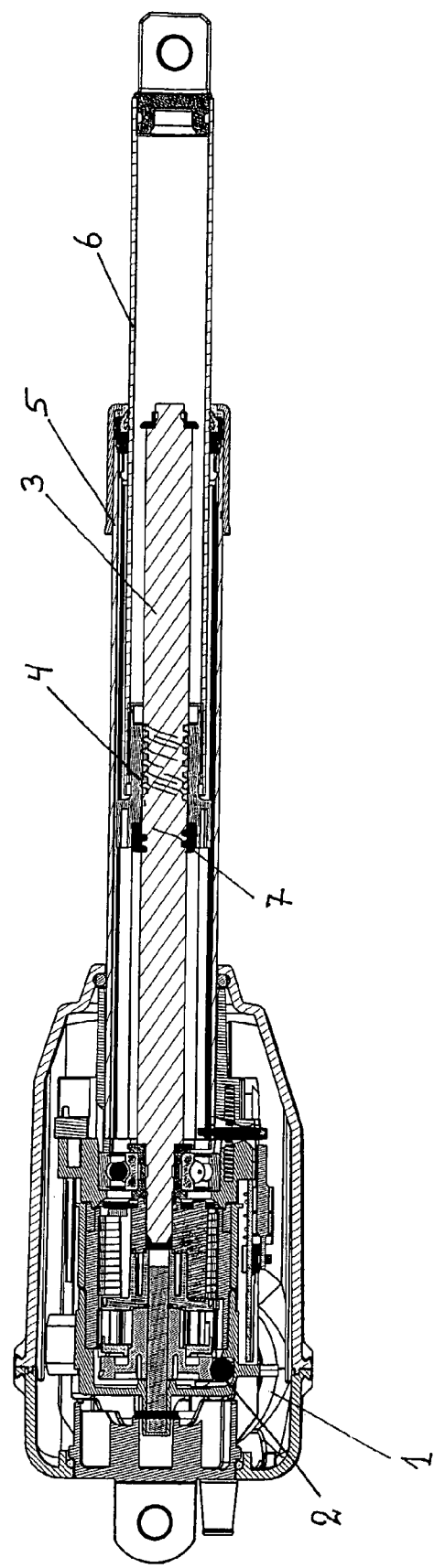
FIG. 1 shows a longitudinal section through an actuator.

As will appear from FIG. 1, the actuator comprises a reversible electric motor 1 which, via a transmission 2, drives a spindle 3 on which a main nut 4 secured against rotation is provided, so that the nut is moved out or in on the spindle depending on the direction of rotation of the spindle. A tubular thrust rod 6, guided in an outer pipe 5, is secured to the main nut 4, the thrust rod being extended from or retracted into the outer pipe 5 by the movement of the nut. The actuator concerned is intended to accommodate pressure loads.

Figure 2:
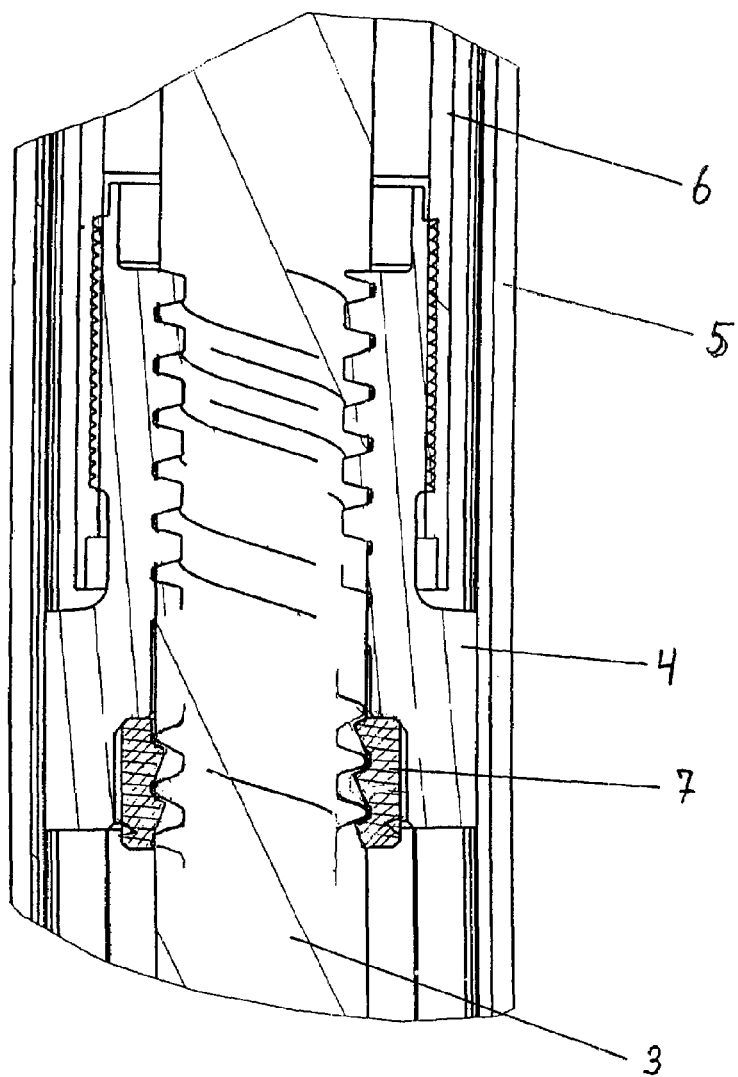
FIG. 2 shows an enlarged longitudinal section through the area at the main nut.

It appears from the detailed view in FIG. 2 that a safety nut 7 is provided in a well 10 at the end of the main nut 4, the safety nut being secured against rotation relative to the main nut in such a manner that it follows the main nut as a slave, as long as the threads of the main nut are intact and are out of engagement with the threads of the spindle. With reference to FIGS. 5-8, the safety nut 7 is secured in that it is provided with a non-through groove 11 which is arranged inwardly over a fin 12 in the well 10. When the groove 11 is not through-going, easy and correct mounting of the safety nut is ensured.

As will appear, the spindle 3 is provided with external trapezoidal threads, and the main nut 4 has internal threads corresponding thereto.

The safety nut 7 has specially configured internal threads. A first flank 8 of the threads corresponds to the threads of the spindle. A second flank 9 of the threads, on the other hand, forms an acute angle v with the longitudinal axis of the nut, that is the flank is steep.

If the threads of the main nut fail, e.g., because of abnormal wear or material defect, the load on the thrust rod 6 will cause the spindle nut and thereby the safety nut 7 to sag, i.e., slide slightly back so that the steep flank 9 of the safety nut gets into contact with the outer edge of the spindle threads flank facing away from the actuator. The safety nut hereby takes over the load.

Figure 3:
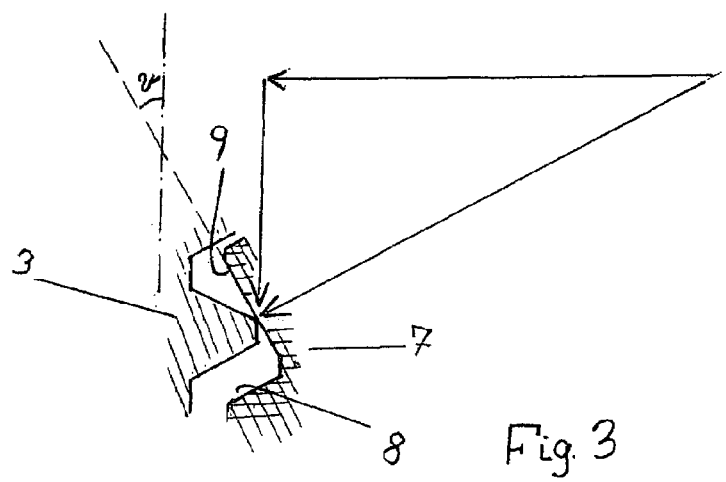
FIG. 3 shows a schematic view of the forces at the contact of the safety nut with the threads of the spindle.

As will appear from the schematic drawing in FIG. 3, a great power component occurs in the contact with the steep flank, resulting in a great frictional force. This ensures the safe state that the actuator can hold the load, but not lift it. The user will see that the thrust rod stands still because the connection of the safety nut with the main nut has been interrupted and the safety nut participates in the rotation of the spindle. If the load is lowered, i.e. the thrust rod is retracted, then the spindle will run free of the steep flank of the safety nut, and the load is now carried on the first flank of the safety nut in engagement with the threads of the spindle.

Provisional tests have shown that an angle v of 20°-30° gives the desired frictional force.

Figure 4:
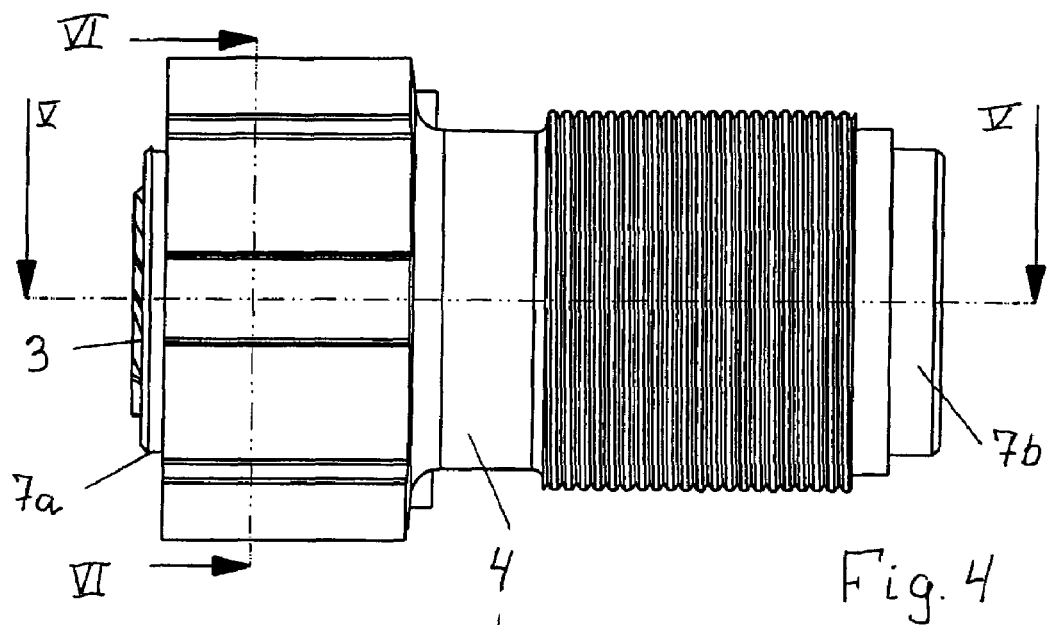
FIG. 4 shows the main nut seen from the side.
Figure 5:
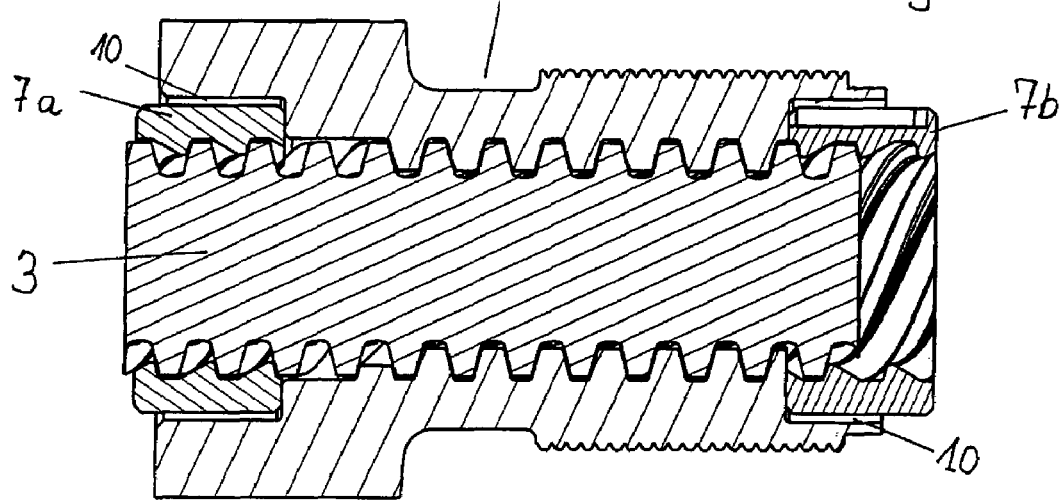
FIG. 5 shows a longitudinal section through the main nut, shown with a portion of the spindle and with a safety nut at each end.
Figure 6:
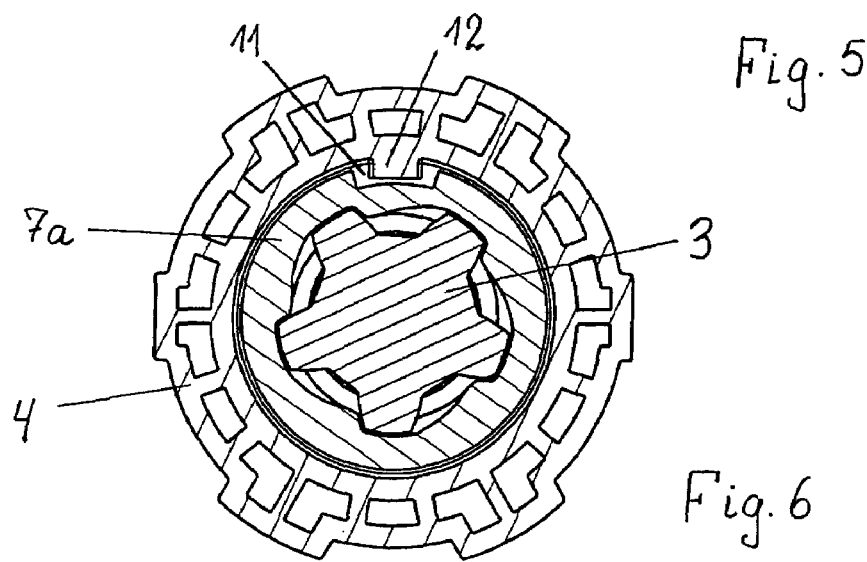
FIG. 6 shows a cross-section through the main nut.

It will be appreciated that the invention also applies to actuators which are under tension, the safety nut then just has to be moved to the other side of the main nut. It is evident that a respective safety nut 7a, 7b may be arranged, if the actuator is under pressure as well as tension, cf. the embodiment shown in FIGS. 4-6.

An actuator has been described in the foregoing where a tubular thrust rod guided in a guide profile is secured to the spindle nut. It will be appreciated that, alternatively, the actuator may be constructed without an thrust rod, but where the nut is secured directly to the structure in which the actuator is incorporated, as is known, e.g., from DK 174457 B1.

The invention claimed is:

1. A linear actuator comprising:
a spindle (3) having external threads,
a main nut (4) riding on the spindle and having internal threads in engagement with the external threads of the spindle,
a safety nut (7) with internal threads defined by a first flank (8) and a second flank (9), said safety nut being arranged on the spindle in connection with the main nut (4), and said safety nut being designed such that, when the main nut is intact, it is not in carrying contact with the threads of the spindle, said flank (8) of the spindle nut engages the threads of the spindle when the main nut fails, and wherein the second flank (9) of the safety nut (7) forms an acute angle with a longitudinal axis of the safety nut.

2. The actuator according to claim 1, wherein the acute angle is between about 20 to 30°.

3. The actuator according to claim 1, wherein the safety nut (7) consists of metal with hardened threads.

4. The actuator according to claim 1, wherein the safety nut (7) is mounted in a well (10) in an end of the main nut (4), the well includes at least one axially extending fin (12), and the safety nut includes a groove (11) in an external surface to receive the at least one fin (12) of the main nut, said groove (11) extending from one end of the safety nut only over a portion length of the safety nut.

5. The actuator according to claim 1, including a safety nut (7*a*, 7*b*) at each end of the main nut (4).

* * * * *